Patented Apr. 11, 1944

2,346,369

UNITED STATES PATENT OFFICE

2,346,369

SEISMIC SURVEYING

Joseph D. Eisler, Tulsa, Okla., assignor to Stanolind Oil and Gas Company, Tulsa, Okla., a corporation of Delaware Application February 28, 1942, Serial No. 432,869

3 Claims. (Cl. 177—352)

This invention pertains to the art of seismic surveying and more particularly to improvements in the distortionless recording of the waves received by a seismometer in a process of such surveying.

It is customary in present day practice of this art to employ filters interposed at some point between the seismometer and the recorder in order to eliminate the low frequency extraneous waves which are generated in the seismometer by ground roll or the like and the high frequencies due to such effects as wind, microseisms and microphonics of the cable between the seismometers and the recording truck, etc. The use of such filters in the prior art has generally resulted in increasing the ratio of the desired signal to extraneous noise but, on the other hand, I have found that the indiscriminate use of such filters has caused phase distortion in the recording.

It is an object of this invention to provide seismic surveying apparatus by means of which the desired reflected seismic waves which have been changed into electrical waves are filtered to remove undesirable low and high frequencies without introducing phase distortion prior to the step of recording said waves. It is a further object of this invention to provide a particular design of filters for use in seismic surveying recording apparatus by means of which electrical waves of various frequencies passed by this filter are delayed an equal period of time and by means of which no phase or time delay distortion will occur. Further objects and advantages of this invention will be apparent from a reading of this specification.

In the past the design of electrical frequency discriminating networks used in suppressing the ground motions such as those due to ground roll and wind have been effected on the basis of amplitude response only. In general filters passing waves the frequency of which are in the range between approximately 20 cycles per second and 150 cycles per second have been used. Amplitude responses covering various portions of the useful frequency spectrum have been used in different sections of the country. However, I have found that the indiscriminate use of such filters leads to a distortion which has not been recognized by the art.

The ideal system of frequency discrimination possesses the property of discriminating against unwanted frequencies without introducing phase or time delay distortion. By phase distortion is meant the phenomenon occurring in such filters in which frequency components of a particular signal are delayed by a different amount of time as they pass through the filters so that the output wave contains a combination of the components of the signal arranged in a different fashion than that present in the input to the filters. Likewise an average time delay is interposed which varies from one set of filters of one particular design to another so that an undesirable time lag appears in the resultant record. The ideal system should make it possible to record the desirable frequency components of the ground motion while preserving the time relationship of these components after they impinge upon the seismometer. An additional advantage of such a system is the possibility of correlating records obtained using filters of various discriminations without distorting the complex wave patterns provided these filters have overlapping amplitude response characteristics. After considerable experimentation I have found that a recording system approaching the ideal can be realized if certain relationships are observed in designing the filter elements in these seismic recording systems. When these relationships are observed, it is possible to design seismic recording systems which have practically no phase distortion throughout the desired band of frequencies to be recorded and furthermore it is possible to employ various widths of pass band without disturbing this relationship.

In order to illustrate the invention more completely, certain drawings have been appended hereto and made a part hereof. In these figures the same reference numeral refers to the same or a corresponding part.

Figure 1 represents in diagrammatic form a recording system for use in seismic surveying employing one embodiment of my invention;

Figure 2 is a diagram of a generalized band pass filter;

Figure 3 is a wiring diagram of one variety of band pass filter;

Figure 4 is a graph of the phase characteristic of a band pass filter; and

Figure 5 is a diagrammatic representation of an alternative seismic recording system utilizing another embodiment of my invention.

Referring now to Figure 1: a seismometer 11 is shown resting on the surface of the ground 12 in the region in which the seismic investigation is to be carried on. This seismometer is connected by conductors 13 to an input transformer 14 in the recording truck. The secondary of this transformer 14 is connected between cathode and grid of vacuum tube 15, which may for example be a pentode as shown, the cathode of which is connected to a biasing circuit comprising resistance 16 and condenser 17. The screen grid of this tube is energized from a battery 18 or other source of potential, preferably but not necessarily through a filter resistance and filter condenser indicated generally by numeral 19, the other side of which is grounded. The output of this vacuum tube 15 is coupled by means of a filter indicated generally by numeral 20 to the grid of a second vacuum tube 21. The cathode of the second vacuum tube 21 is suitably biased by means of a cathode resistance 22 across which is a shunt condenser 23. The output of this tube 21 is coupled by means of a transformer 24 to a recorder 25 which customarily includes a multiplicity of highly sensitive recording galvanometer elements and other equipment well known in the art. A portion of the output of vacuum tube 21 is impressed through a coupling condenser 26 on a gain control device 27. This gain control device has been shown in block diagram form, as any of the types now well known in the art may be employed, and since this invention does not depend upon the use of such device. The filaments of both vacuum tube 15 and vacuum tube 21 are connected at points X—X to a suitable source of potential such as a storage battery.

In operation a charge of dynamite is exploded in the ground. The refracted, reflected and ground waves energize the seismometer 11, setting up electric waves which include the components which are to be recorded. These components usually fall somewhere in the range between about 20 cycles per second and 150 cycles per second. The useful frequency spectrum varies from one region to another and quite often desirable information can be obtained only if certain unwanted frequencies are suppressed. The electric waves pass through the transformer 14 into the amplifier tube 15, where they are amplified and pass into the band pass filter 20, at which point the undesirable frequency components are eliminated, and then through the amplifier tube 21 into the recorder. Usually the gain control is set in such fashion that the output to the recorder 25 is more or less uniform regardless of the strength of the incoming signals.

It is found that when an electric wave passes through a band pass filter, in general there will be a time delay interposed so that the output signal lags behind the input signal. If the time delay is not uniform for all of the frequency components of the signal, the output wave will be distorted by the filter even though all of the components of the input wave are within the pass band of the filter. This phenomenon of distortion due to time delay which can be conveniently described as time delay or phase distortion is relatively unimportant in most of the filter applications. Thus, for example, in telephone work the ear integrates the various impulses which are transmitted to it by the telephone so that even if the frequency components are out of phase there is little difficulty in obtaining intelligibility of the resulting distorted signal. Obviously this is not the case in seismic prospecting in which the utmost importance should be attached to the obtaining of the minimum distortion of the desired signals.

The phenomenon of time delay distortion can be discussed in connection with various types of filters, but it is perhaps most easily understood by a discussion of the type of filters which I prefer to use in this invention; namely, the variety known as the "constant-K" type filter. In Figure 2 I have shown a wiring diagram of a section of one generalized type of filter commonly known as a T section with two series arms and one shunt arm terminating in the iterative or characteristic impedance $Z_0$. The impedance of each series arm is $$\frac{Z_1}{2}$$

and the impedance of the shunt impedance is $Z_2$. In the constant-K type of filter the product of $Z_1 Z_2$ is a constant. The terminating iterative impedance for correct operation is given by $$Z_0 = \sqrt{Z_1 Z_2 + \frac{Z_1^2}{4}}$$

The signal is introduced, for example, in series with the input impedance $Z_0$. This is represented in Figures 2 and 3 by a zero impedance source of E. M. F. 32. When such a filter is made up of a series resonant circuit for each of the series arms and a parallel resonant circuit for the shunt arm in the manner shown in Figure 3 with the product of the inductance 28 and the capacity 29 in each series arm equal to the product of the shunt inductance 30 and shunt capacity 31, a band pass filter is obtained. It is possible to design such a filter to pass any desired band width between a lower cut-off angular frequency $\omega_1$ ($\omega$ is $2\pi$ times the frequency) and a higher cut-off frequency $\omega_2$, attenuating strongly at frequencies which lie beyond the upper and lower limits. Design data for such filters including more complex types can be found in numerous places and hence is not reproduced here. For reference see, for example, Communication Engineering, by Everitt, pages 151 to 178. Note that in Figure 1, resistance 36 and the plate resistance of vacuum tube 15 in parallel must equal the iterative impedance 34 in Figure 3.

When pure sine waves of various frequencies are impressed on the filter by generator 32, it is found that only at one frequency is the output across the terminating impedance 33 in phase with the input signal. This occurs at the angular mid frequency $\omega_m$. Within the pass band, that is from lower cut-off angular frequency $\omega_1$ to upper cut-off angular frequency $\omega_2$, I have found that the phase difference between the input and output signals varies approximately linearly, passing through zero at the mid frequency $\omega_m$. This is illustrated by the graph of Figure 4 in which the phase angle of the output sine wave across the terminating iterative impedance 33 compared to that of the input wave across iterative impedance 34 has been plotted as a function of the frequency.

The fact that this characteristic is substantially linear is of definite importance. When a composite wave such as a signal from a seismometer consists of two or more frequencies, it is necessary, as discussed above, to delay each frequency component of the wave by the same amount when passing it through the filter if no phase distortion is to be obtained. The phase shift $\beta$ is related to the time delay $\Delta t$ for any single frequency by the expression $$\Delta t = \frac{\beta}{\omega}$$

where $\omega$ is the angular frequency of the signal component in radians per second and $\beta$ is the phase angle in radians. To have the delay time for all frequency components the same, it is necessary that $\Delta t$ be constant; hence the phase shift $\beta$ must vary linearly with $\omega$. This condition is satisfied in the pass band of a constant-K band pass filter. Therefore, there will be the same delay time along all components of a complex wave so that this type of phase distortion is therefore eliminated when such a filter is employed.

A further requirement in order to eliminate time delay distortion from the resulting waves is that when the straight line portion of the phase shift curve be extrapolated (shown by the dotted line 35 in Figure 4) to intersect the zero angularity frequency axis at the point marked $\beta_0$ the resultant apparent phase shift at zero frequency $\beta_0$ must be zero or an integral multiple of $\pi$. This can be easily shown by the following analysis. Let the incoming signal be composed of two frequency components:

$$e = E_1 \sin \omega_3 t + E_2 \sin \omega_4 t$$

where both $\omega_3$ and $\omega_4$ lie in the pass band of the filter. By referring to Figure 4 it is seen that the corresponding phase shifts at the frequencies $\omega_3$ and $\omega_4$ are $\beta_3$ and $\beta_4$. The output signal will therefore be $$e' = E_1 \sin (\omega_3 t + \beta_3) + E_2 \sin (\omega_4 t + \beta_4)$$

If the slope of the line 35 be $m$, it is apparent that $$\beta_3 = \beta_0 + m\omega_3$$

and that $$\beta_4 = \beta_0 + m\omega_4$$

Therefore $$e' = E_1 \sin (\omega_3 t + m\omega_3 + \beta_0) + E_2 \sin (\omega_4 t + m\omega_4 + \beta_0)$$

It can be easily seen that when $\beta_0 = \pm 2n\pi$ where $n$ is an integer (including zero) the expression for $e'$ becomes $$e' = E_1 \sin (\omega_3 t \pm \omega_3 m) + E_2 \sin (\omega_4 t \pm \omega_4 m)$$

or $$e' = E_1 \sin \omega_3 (t \pm m) + E_2 \sin \omega_4 (t \pm m)$$

Thus the resultant wave is not distorted with respect to the input wave but is simply delayed by $m$ which is the slope of the phase shift characteristic.

If $\beta_0 = \pm n\pi$ where $n$ is an odd integer the only change will be that a negative sign must be placed in front of $E_1$ and $E_2$ so that the output signal will still be undistorted but will be inverted with respect to the input signal. Therefore, if a filter is designed with an apparent phase shift at zero frequency ($\beta_0$) of an odd integral multiple of $\pi$, the output terminals of the filters are reversed with respect to the input terminals before the filter is used.

The two criteria for absence of time delay or phase distortion are, therefore, that the phase shift characteristic be linear with frequency and that the apparent phase shift at zero frequency, or stated another way, the intercept of the extrapolation of the linear portion of the phase shift curve on the zero frequency axis must be an integral multiple of $\pi$, preferably an integral multiple of $2\pi$, said integral multiple including the value of zero.

I have found that only certain relationships between the frequencies at the edge of the pass band, i. e. the frequencies of upper and lower cut-off are possible in order to obtain this freedom from phase distortion. This is a consideration which has not heretofore been determined and it immediately shows that only certain relationships between these cut-off frequencies are possible in filters used in seismic amplifiers.

From a consideration of the criteria which have already been developed $\beta_0$ must be $n\pi$ where $\pi$ is an integer, preferably an even integer. From Figure 4 it can be seen that in this case, from similar triangles $$\frac{n\pi - \beta_1}{\omega_1} = \frac{n\pi + \beta_2}{\omega_2}$$

so that $$\frac{\omega_2}{\omega_1} = \frac{n\pi + \beta_2}{n\pi - \beta_1} \quad (1)$$

where $n$ is an integer. Only filters with ratios of the cut-off frequencies which approximately satisfy the above formula, and the phase shift of which in the band pass vary approximately linearly with frequency, are therefore free from phase distortion.

In a simple band pass filter such as that shown in Figure 1, I have found that the absolute values of $\beta_1$ and $\beta_2$ are approximately identical, at a value of about $\frac{2}{3} \pi$. If $n$ is given the value of 2 so that the apparent phase shift at zero frequency has the desired value of $2\pi$ radians, it is apparent from this that $\omega_2$ must be about twice $\omega_1$ or, in other words, the upper cut-off frequency must be approximately twice that of the low cut-off frequency. As a matter of fact, I have found that slight variations from this requirement of the order of about 5% can be tolerated. If $n$ is 1, the apparent phase shift at zero frequency is $\pi$ radians and the ratio of cut-off frequencies is approximately 4. If $\beta_0$ is $3\pi$ the ratio is approximately 1.5. In determining the value of $\beta_1$ and $\beta_2$, the phase characteristic is plotted as shown in Figure 4, a straight line is drawn through the linear portion of the curve, and extrapolated to the cut-off angular frequencies $\omega_1$ and $\omega_2$. If the relationship between $\omega_1$, $\omega_2$, $\beta_1$, and $\beta_2$ is not as given in Equation 1 above, the filter is not distortionless as to phase.

In some cases the band pass filter may be satisfactorily interposed in the seismic recording circuit prior to the amplifier proper. One such arrangement is shown in Figure 5 in which the filter 37 serves as a coupling between the input transformer 14 and the vacuum tube 15. A coupling transformer 38 is shown connecting vacuum tubes 15 and 21, although any desired alternate form of coupling can be employed. The transformer primary can suitably be connected to the plate supply through filter resistance 39 and shunted by condenser 40. It is apparent to those skilled in the art that the band pass filter can be placed as the coupling element between any sections of a multi-vacuum-tube amplifying channel with success and that it is possible, although usually not desirable, to place it as a coupling element between the output of the amplifier and the recorder. In this latter case the output impedance is so low that it requires filter components of an excessively large value. The filter works as well whether or not there is a gain control 27 used in connection with the amplifier. One can if desired change from one distortionless filter having a given frequency ratio, for example 2, to another having another ratio, for example 1.5, without introducing distortion into the system.

In some cases it is desirable to utilize a system in which the overall phase shift characteristic of the system is corrected to remove any phase distortion whatsoever. In such a case I prefer to design the seismometer and the amplifier with the least phase shift possible in the desired range of frequencies and then apply a filter of the type described above in such a manner that in the entire band pass the variation of system phase shift with frequency is linear and the apparent phase shift at zero frequency is an integral (preferably even) multiple of $\pi$.

Various changes and modifications in the systems described above will be immediately apparent to those skilled in this art. I have no intention of limiting the application of this invention to the circuits described above, which were utilized merely for the purpose of illustration. The invention is best described in the appended claims.

I claim:

1. In apparatus for seismic prospecting including a seismometer adapted to produce electric waves in response to seismic waves, an amplifier for said electric waves, and a recorder for recording the output of said amplifier, the improvement comprising an electric band pass filter interposed in said apparatus between said seismometer and said recorder, said filter being so designed and constructed that in the range of frequencies defined by said pass band the phase shift between output from said seismometer and input to said recorder varies substantially linearly with frequency in such a manner that the apparent phase shift at zero frequency is an integral multiple of $\pi$ radians.

2. In apparatus for seismic prospecting including a seismometer adapted to produce electric waves in response to seismic waves, an amplifier for said electric waves, and a recorder for recording the output of said amplifier, the improvement comprising an electric constant-K type band pass filter interposed in said apparatus between said seismometer and said recorder, said filter being so designed and constructed that in the range of frequencies defined by said pass band the phase shift between input to said filter and output from said filter varies approximately linearly with frequency in such a manner that the apparent phase shift at zero frequency is an integral multiple of $\pi$ radians.

3. In apparatus for seismic prospecting including a seismometer adapted to produce electric waves in response to seismic waves, an amplifier for said electric waves, and a recorder for recording the output of said amplifier, the improvement comprising an electric constant-K type band pass filter interposed in said apparatus between said seismometer and said amplifier, said filter being so designed and constructed that in the range of frequencies defined by said pass band the phase shift between input to said filter and output from said filter varies substantially linearly with frequency and in which filter the ratio of frequency at upper cut-off $f_2$ to frequency at lower cut-off $f_1$ is given approximately by the formula $$\frac{f_2}{f_1} = \frac{n\pi + \beta_2}{n\pi - \beta_1}$$

where $n$ is an integer, and $\beta_2$ and $\beta_1$ are the phase shift angles at the frequencies $f_2$ and $f_1$ respectively.

JOSEPH D. EISLER.